Jan. 20, 1942.   F. W. HAEGER ET AL   2,270,522
CRANKSHAFT BEARING POLISHING MACHINE
Filed Jan. 27, 1940   4 Sheets-Sheet 3
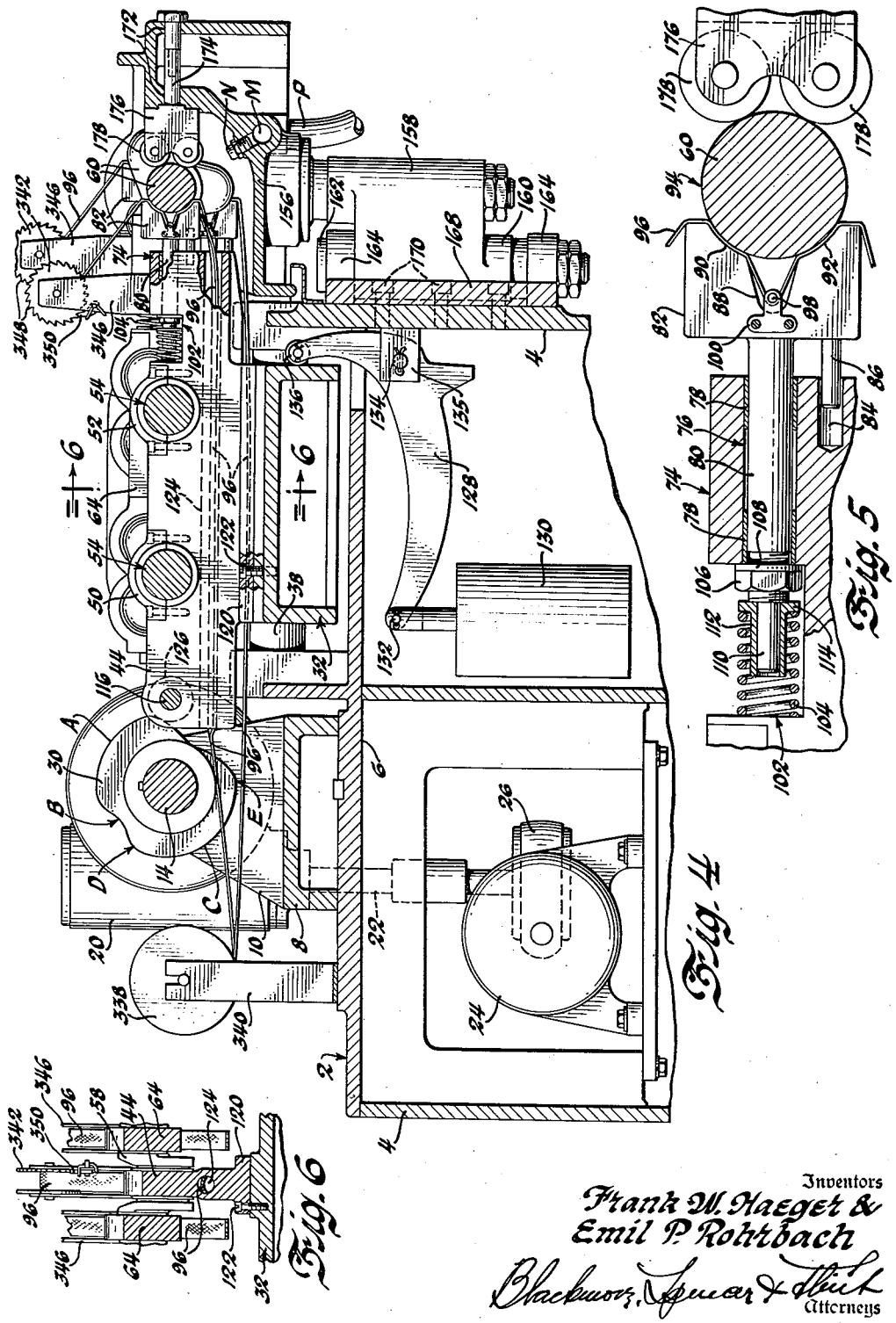
Inventors
Frank W. Haeger &
Emil P. Rohrbach
Blackmore, Spencer & Shuit
Attorneys Jan. 20, 1942.　　　F. W. HAEGER ET AL　　　2,270,522
CRANKSHAFT BEARING POLISHING MACHINE
Filed Jan. 27, 1940　　　4 Sheets-Sheet 4

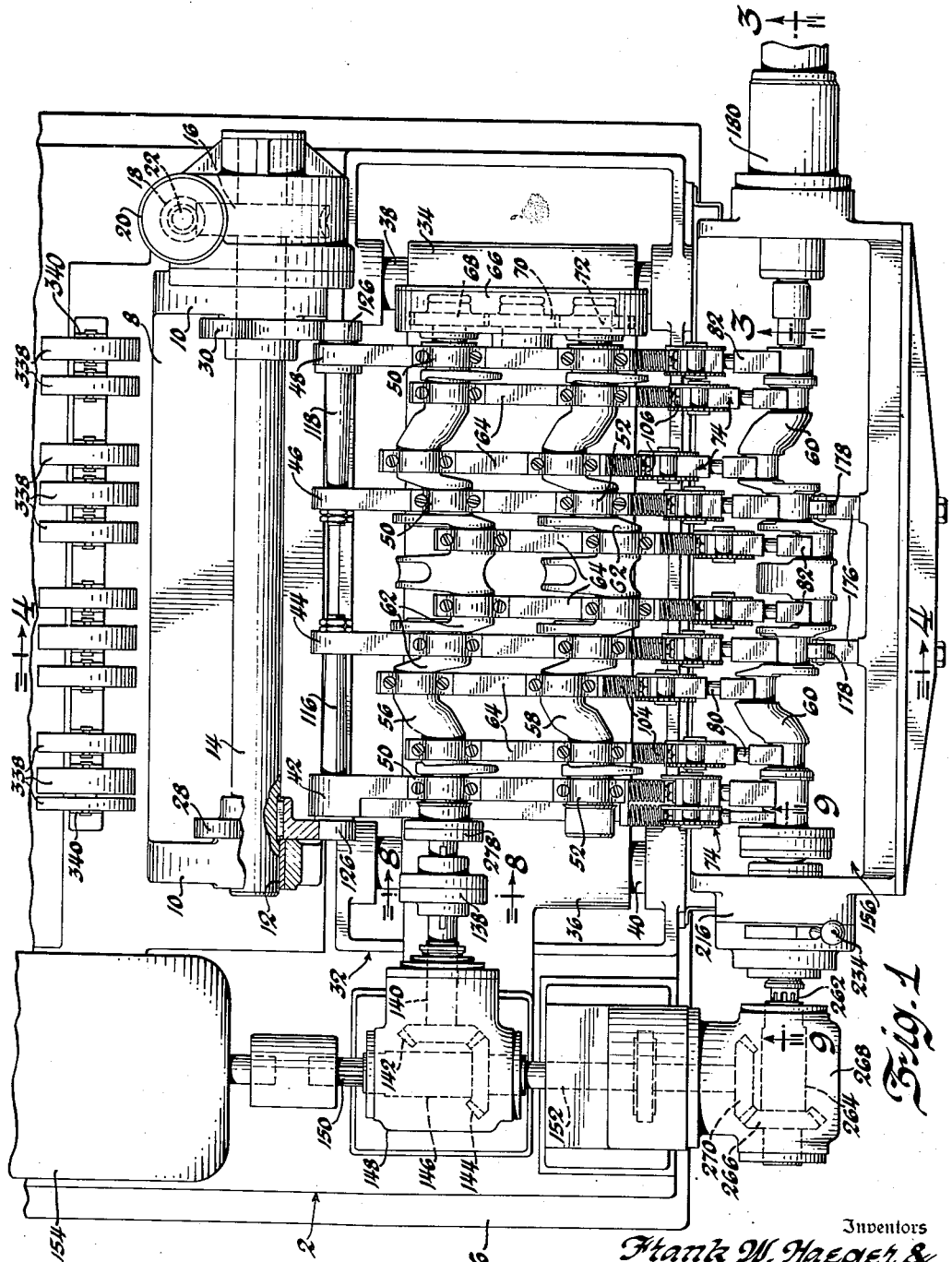

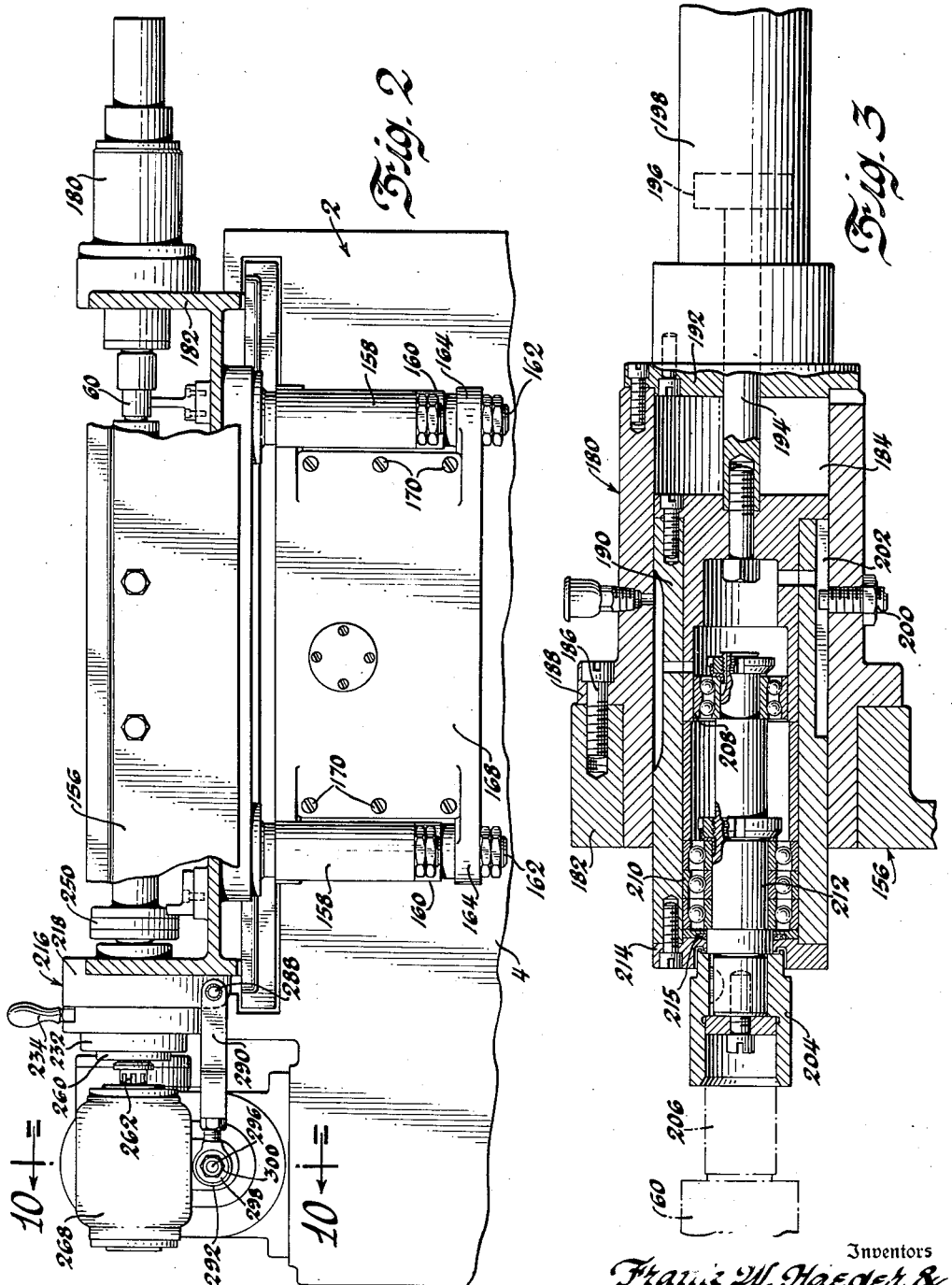

Inventors
Frank W. Haeger &
Emil P. Rohrbach
Blackmore, Spencer & Flint
Attorneys Patented Jan. 20, 1942

2,270,522

UNITED STATES PATENT OFFICE 2,270,522

CRANKSHAFT BEARING POLISHING MACHINE

Frank W. Haeger and Emil P. Rohrbach, Lansing, Mich., assignors to General Motors Corporation, Detroit, Mich., a corporation of Delaware Application January 27, 1940, Serial No. 315,908

3 Claims. (Cl. 51—154)

This invention relates to machines for polishing the main journals and crankpins of the crankshafts used on internal combustion engines of automotive vehicles.

The essential novelty of the machine resides in the provision of a table adapted to slide to and from the crankshaft to be polished. The table is provided with two master crankshafts, duplicates of the crankshaft to be polished. The crankshafts have secured thereto a plurality of arms, the ends of which are provided with polished heads which engage the bearings of the shaft when the table is moved toward the crankshaft. The machine is power operated in such a way that the two master cranks and the crankshaft to be polished rotate in unison, and the rotation of the cranks and the shaft, together with the movement of the table toward the crankshaft, causes the emery paper or other abrasive material to polish the bearings of the shaft.

Cams are used to slide the table toward the crankshaft and each cam is so formed that for the initial part of their rotation the cams tightly press and hold the abrasive material against the bearings to polish the same. Recesses in the cams then permit the carriage to be withdrawn until a slight space is left between the emery cloth and the bearings and this slight space enables a flushing oil to be flowed therebetween to remove any free abrasive, or grit of any kind. The cam then again moves the table toward the crankshaft and causes the abrasive material to be pressed tightly against the bearings and the subsequent peripheral shape of the cam is such that there is a very gradual release of the pressure of the polishing heads against the bearings until the pressure is entirely released. The crankshaft is then removed and another crankshaft placed in the machine.

The specific polishing head also forms a novel part of the invention, this polishing head being spring pressed against the bearings on the crankshaft for the first part of the polishing movement. Continued movement of the table toward the crankshaft causes the spring of the head to be shut tight and the pressure thereafter against the bearings is contant.

A further object of the invention is the provision of an oscillatable carriage on which the crankshaft to be polished is mounted. The width of the polishing heads is slightly less than the width of the bearings, and in order to enable the entire bearing surface to be polished the carriage is given a reciprocating motion through a very short arc. This reciprocating motion enables the abrasive on the polishing head to polish the entire bearing.

On the drawings,

Figure 1 is a plan view of the polishing machine with parts broken away and shown in section.

Figure 2 is an end elevation of the machine with parts broken away and shown in section better to illustrate the construction.

Figure 9:
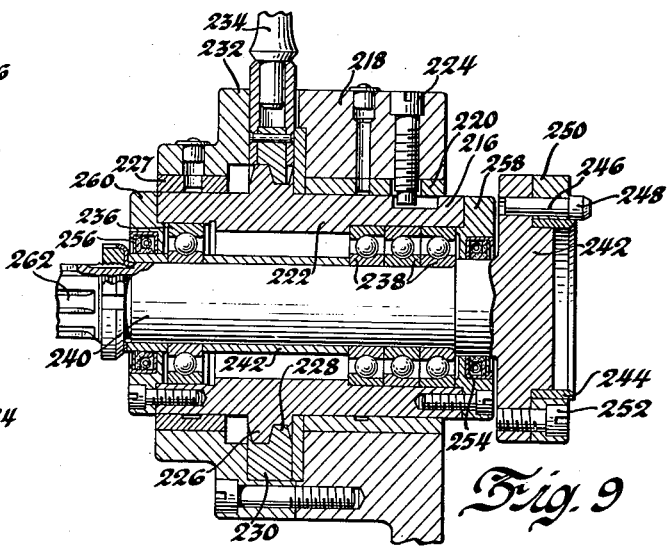

Figures 3, 4, and 9 are sections on the corresponding lines of Figure 1.

Figure 5 is an enlarged detailed view of the polishing head.

Figure 6 is a detailed view on the line 6—6 of Figure 4.

Figure 7:
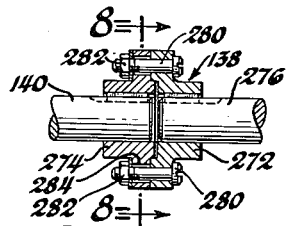
Figure 8:
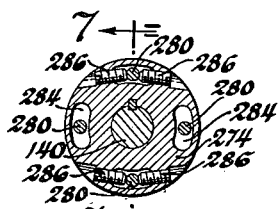

Figure 7 is a sectional detailed view on the line 7—7 of Figure 8.

Figure 8 is a sectional detailed view on the line 8—8 of Figures 1 and 7.

Figure 10:
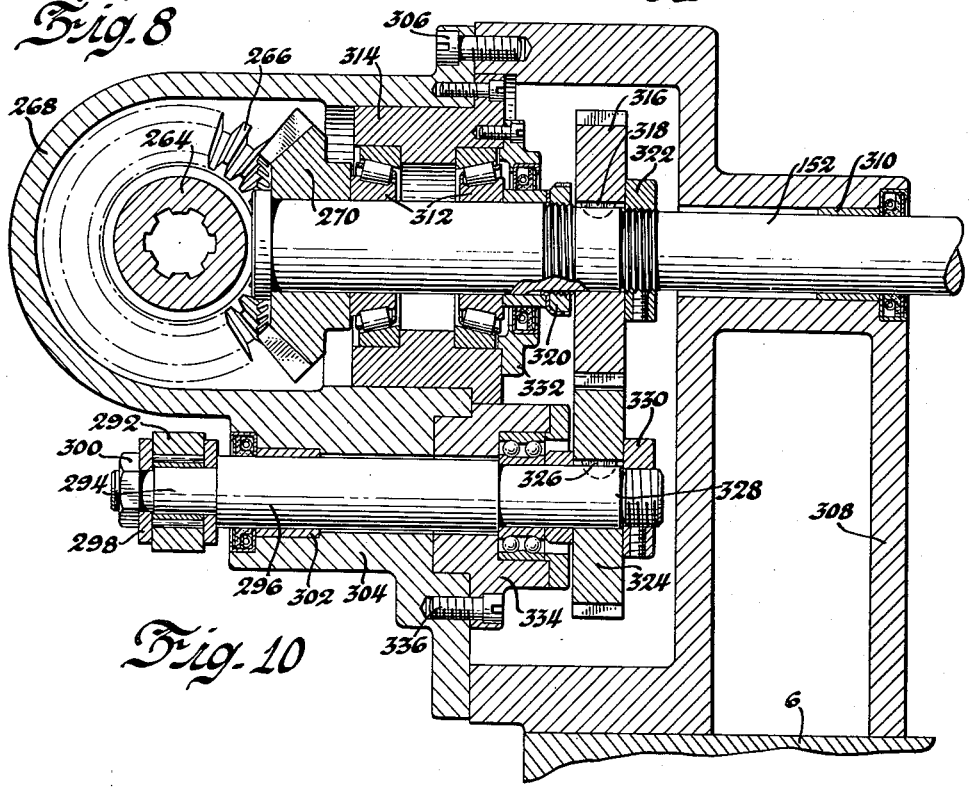

Figure 10 is a sectional detailed view on the line 10—10 of Figure 2.

Referring to the drawings, the machine as a whole is indicated at 2. The machine is provided with the upright frame 4 (Figure 4) at the upper part of which there is the flat table-like part 6. On the table 6 at one side of the machine there is secured the subframe 8 having the upstanding ends 10 provided with openings in each of which a bearing 12 is mounted. In the bearings 12 the shaft 14 is mounted. The shaft 14 has a worm wheel 16 secured to one end thereof, and a worm 18 is mounted in the housing 20 and meshes with the worm wheel 16. The worm 18 is secured to a shaft 22 which is connected to an electric motor 24 by means of suitable gearing provided in a housing 26.

The shaft 14 has two similar cams 28 and 30 secured thereto and positioned immediately adjacent the inner edge of the uprights 10 of the subframe 8.

Immediately adjacent the subframe 8 there is mounted the sliding or reciprocable table indicated as a whole at 32. This table has the end column-like bearing parts 34 and 36 which surround the bars or rods 38 and 40 and are adapted to slide thereon. The table comprises the upwardly projecting stationary polishing arms 42, 44, 46, and 48 and each of these arms is provided with bearings having the removable bearing caps 50 and 52. The bearings are for the purpose of receiving the main bearings 54 of two master crankshafts 56 and 58. These master crankshafts 56 and 58 are in all respects substantial duplicates of the crankshaft 60 which has the bearings which are to be polished.

The throws 62 of the master crankshafts have mounted on the bearings thereof the rotatable polishing arms 64, and these arms 64 are adapted to rotate with the crank throws of the master crankshafts 56 and 58.

Referring to Figure 1, the right hand ends of the master crankshafts 56 and 58 are enclosed in a box 66 and in this box there are enclosed the gears 68, 70, and 72. Gears 68 and 72 are secured to the ends of the master crankshaft 56 and 58 respectively, while the gear 70 is an idler. The gears 68 and 72 are identical in order that the cranks 56 and 58 may be moved in unison.

The ends of the arms 42, 44, or 46 and 48 as well as the ends of the rotatable arms 64 are provided with polishing devices indicated as a whole at 74. One of these polishing devices is indicated in detail in Figure 5. The end of each arm 42, 44, 46, 48 and 64 is provided with a bore 76 in which the bearings 78 are positioned. In these bearings 78 there is received the shank 80 integral with the polishing head 82. The device 74 has an additional bore 84 in which there is received a guiding pin 86 rigid with the head 82.

The head 82 has a central recess 88 and the arcuate polishing surfaces 90 and 92. The polishing surfaces 90 and 92 are given a shape corresponding to the shape of the bearing part 94 on the crankshaft 60 and between the bearing parts 90 and 92 and the bearing part 94 of the crank shaft an abrasive such as a strip of emery paper 96 is positioned. The surfaces 90 and 92 preferably have a strip of emery cloth cemented thereto, the emery paper 96 being between the emery cloth and the bearing.

At the bottom of the recess 88 the pin or shaft 98 is mounted on T-shaped brackets 100 secured to the two sides of the head 82. The emery paper is passed underneath the pin 98 and retains that part of the emery paper not in contact with the polishing faces 92 and 90 away from the bearing part 94.

The polishing device 74 includes a recess 102 formed in each of the polishing arms and in this recess the coil spring 104 is positioned. The end of the shank 80 is threaded and has a nut 106 secured thereto. A washer 108 is positioned between the nut 106 and the end face of the recess 102. The nut 106 and washer 108 limit the movement which the spring 104 may give to the shank 80.

The end of the shank is reduced as indicated at 110 and fits into the cylindrical socket 112 which is received in the spring 104. The socket is provided with an end flange 114 and fits over the end of the coil spring 104.

The description of the structure of Figure 5 for one of the polishing devices will suffice for all of them. The single difference will be in the width of the device or the shape of the polishing surface 90 or 92, but they are structurally otherwise identical.

The ends of the arms 42 and 44 and the ends of the arms 46 and 48 are united by means of the rods 116 and 118 to make the structure more rigid and to serve as a mounting for the rollers 126. The arms 42, 44, 46 and 48 are secured to the table 32 in the manner shown in Figure 6. The arms have the lateral flanges 120 and these flanges are provided with a plurality of openings through which there pass the machine screws at 122 which are threaded into the sliding table 32.

Each of the arms 42, 44, 46 and 48 is provided with a bore 124 therethrough and through this bore there is led the strip of emery cloth 96 used to polish the crankshaft bearings.

For the rotatable arms 64 the emery cloth 96 merely passes freely over the top of the sliding table 32 as is best shown in Figures 4 and 6.

The cams 28 and 30 operate against rollers 126 which are secured to the ends of the bars 116 and 118 and the rotation of the cams 28 and 30 moves the table 32 toward the crankshaft 60. The reverse movement of the table is caused by means of the lever 128 and the weight 130. The weight is pivoted to the end of the lever at 132 and the lever in turn is pivoted at 134 to an arm 135 attached to the frame 4 of the machine. The free end of the lever 128 is provided with a roller 136 which bears against one side of the table 32. This structure is best shown in Figure 4.

In order that the master crakshafts 56 and 58 may be rotated, the shaft 56 is joined by means of an adjustable connection 138 to a shaft 140 which has secured thereto the gear 142 which meshes with the gear 144 rigidly mounted on a collar 146 which in turn is rigidly mounted in the housing 148. As indicated at 150, the collar 146 is splined on a power shaft 152 driven from an electric motor 154. When the cams 28 and 30 move the slidable table 32, the collar 146 will slide on the splines 150 of the shaft.

The crank shaft 60 which has the bearings to be polished is mounted on an oscillatable carriage indicated as a whole at 156. This carriage has two downwardly extending studs or trunnions journaled in the sockets 158 which in turn have the integral sockets 160 which are mounted on pins 162 supported in bearing eyes 164 formed on a frame 168 secured to the base 4 of the machine by means of the machine screws 170.

The table 156 has openings 172 formed therein in alignment with the main bearings of the crankshaft 60. In each of these openings there is received a shank 174 which has thereon a head 176 on which there are pivotally mounted the rollers 178. This head 176 is stationary and serves as a backing for the main bearings 94 of the crankshaft 60.

The reciprocating carriage is provided with a tail stock 180 best shown in Figure 3. This tail stock is mounted in an upright 182 formed on the oscillating carriage 156. A cylinder 184 is secured by means of the flange 188 and the machine screws 186 to the side of the upright 182. In this cylinder there is the piston 190, and the end of the cylinder is closed by the head 192. The piston has secured thereto the rod 194 which passes through the head 192. The rod has secured thereto the piston 196 which is air operated from the cylinder 198 and the admission of air to the cylinder 198 by means of suitable piping will move the piston 190 to the left.

A set screw 200 secured in the cylinder 184 has its end fitting in a slot or groove 202 in the piston and guides the piston 190 in its movement.

The piston 190 is hollow and has rotatably mounted therein the holder 204, the end of which is hollow and is adapted to receive the end 206 of the crankshaft 60. Roller bearings 208 and 210 rotatably mount the shaft 212 of the holder 204 in the piston 190 and the end cap 214 holds the bearing and holder in the piston 190. A lubricant seal 215 is provided between the shaft 212 and the cap 214.

The headstock on the shiftable carriage 156 is indicated as a whole at 216. This headstock is mounted in the upright 218 on the oscillatable carriage 156. The upright 218 is provided with a bore in which there is positioned the bushing 220 and in the bushing 220 a second bushing 222 is mounted. A set screw 224 passes through the upright 218 and into a groove in the bushing 222 and holds it in place. A second bushing 227 is provided between parts 222 and 232. The bearing 222 is capable of a limited amount of rectilinear movement in the bushing 220 and this movement is caused by the interengagement of the cam surface 226 on the bushing 222 and the cam surface 228 on a rotatable member 230 held against the upright 218 by means of an end cap 232. The member 230 is rotatable between the cap 232 and the upright 218 by means of the handle 234. By turning the member 230 by means of the handle 234, the interengagement of the cam or threaded surfaces 226 or 228 will cause the bushing 222 to be moved either to the right or to the left, depending upon the direction in which the handle 234 is rotated. The purpose of this movement will be later described.

In the bushing 222 there are positioned the roller bearings 236 and 238 and in these bearings 236 and 238 there is mounted the shaft 240. A suitable spacing collar 242 retains the bearings 236 and 238 apart.

The shaft 240 has the enlarged head 242 which has secured thereto the hardened ring 244 and is provided with the pins 246 having the heads 248. The hardened ring 244 is used so that it may be easily replaced to accommodate for wear. The heads 248 project beyond the rim of the ring 244 and are adapted to engage in openings in the end flange of the crankshaft to hold the crankshaft and cause it to rotate with the shaft 240. The ring 244 fits against the end face of the end flange of the shaft. The pins 248 and the ring 244 are held in place by means of the ring 250 secured to the head 242 by means of the machine screws 252.

Suitable oil seals 254 and 256 are provided at both ends of the bushing 222 and are held in place by means of rings 258 and 260 respectively.

Beyond the upright 218 of the oscillating frame 156 the shaft 240 is splined as indicated at 262 and this splined end 262 is received in the splined collar 264 to which the bevel gear 266 is secured. The collar 264 is rotatably mounted in suitable bearings in the gear box 268 and the gear 266 meshes with a bevel gear 270, rigidly secured to the shaft 152. The gears 144 and 270 are identical as are the gears 142 and 266 so that the same rate of rotation is given to the master crankshafts 56 and 58 on the one hand, and the crankshaft 60 on the other hand.

In order to insure that there will be uniformity of rotation, the connection 138 shown in detail in Figures 7 and 8, is capable of very fine adjustments to take care of lash in the gears 2, wear, etc. The shaft connection 138 is formed of the two halves 272 and 274 which are secured respectively to the shafts 276 and 140. The shaft 276 is secured by a suitable adjustment connection 278 to the end of the master crankshaft 56. The two halves 272 and 274 are united by means of the bolts 280 and nuts 282. In Figure 8 it will be seen that two of the bolts 280 operate in arcuate slots 284 in the half 274 while the other diametrically opposite bolts 280 are held in place by means of set screws 286 operating in threaded openings formed in the connection half 274. By unscrewing two diametrically opposite set screws 286 and screwing inward the opposed diametrically opposite set screws 286, a very fine adjustment between the shafts 140 and 276 is possible and enables the taking up of any inaccuracies due to lash or wear.

Referring to Figures 2 and 10, there is illustrated the structure for oscillating the oscillatable carriage 156. The carriage 156 has pivoted thereto at 288 a link 290, the opposite end 292 of which is mounted on an eccentric on the end 294 of a stub shaft 296. The end of the link 292 is held between washers 298 by means of a nut 300 screwed onto the threaded end of the shaft 296. The shaft 296 is mounted in the bearing 302 positioned in an extension 304 formed on the gear box 268. This gear box 268 is secured by means of the machine screws 306 to a subframe 308 mounted on the frame 4.

This upright 308 has a bearing 310, and a double roller bearing 312 is positioned in a box 314 secured in the end of the gear box 268, and in these two bearings 310 and 312 the shaft 152 is rotatable.

Between the box 314 and the face of the upright 308 a gear 316 is secured to the shaft 152 by means of a key 318. The gear 316 is held in place by means of the collars 320 and 322. The gear 316 meshes with a second gear 324 keyed as at 326 to the end 328 of the stub shaft 296. The gear 324 is held to the shaft by means of the nut 330 screwed onto the threaded end of the shaft. A roller bearing 332 is provided for the end 328 of the shaft 296 and this roller bearing is mounted in a bearing retainer 334 secured by means of the machine screws 336 to the gear box 268.

From the structure just described in Figures 2 and 10, it will be apparent that the rotation of the shaft 296 will give to the link 290 a short reciprocating motion because of the eccentric mounted at the end 294 of the shaft 296. The to and fro movement of the link 290 will cause the carriage 156 to oscillate on the pivot pins 162. The reason for giving this reciprocating motion to the carriage 156 is that the width of the emery cloth or abrasive 96 is slightly less than the width of the bearing to be polished and in order that all of the bearing may be polished, this short reciprocating motion will move the crankshaft 60 to and fro to cause all parts thereof to come in contact with the abrasive.

In Figures 1 and 4 there are shown a plurality of spools 338 which have thereon the emery cloth 96 and these spools are mounted on suitable uprights 340 secured to the flat table 6 of the frame.

Each polishing arm has at its end a spool 342 mounted on uprights 346 secured to the arm. These spools are mounted on suitable pivots and one edge of the spool is preferably formed with ratchet teeth 348 and a pawl 350 engages the teeth and prevents the rotation of the spool in one direction. After the crankshaft has been polished, the operator will rotate the spools 342 a suitable distance in order that a new surface of emery cloth will be presented for polishing the next crankshaft.

Referring to Figure 4, and particularly to the cam 30, the position of the parts is shown just before the cams 28 and 30 are to press the table 32 and its bearing heads against the bearing parts of the shaft. In the position as shown, the springs 104 have begun to be compressed, and as the cams rotate further, the rollers 126 will arrive at the end of the initial or first arc A (Figure 4) of the cam. Through the entire arc A the polishing heads 82 will be held tightly against the bearings of the shaft 60, and throughout this arc the springs 104 will be entirely shut. When the cams reach the end of the arc A the rollers 126 will drop into the recesses B of the cams and this drop is sufficient to enable the polishing cloth 96 to be loosened from the bearings on the shaft 60. In the operation of polishing the shafts an oil is used, and by suitably directing the oil from nozzles N (supplied from a manifold M, fed by a pipe P) onto the bearings, there is a flushing action when this emery paper 96 is withdrawn and this flushing action will remove any free grit which may be between the bearings on the shaft 60 and the emery paper 96. After this grit has been removed, the arc C of the cam will come into play. The initial part of this arc indicated at D has the same compressive value or force against the table 32 and the rollers 126 as the value or compressive force of the part of the cam indicated by the arc A, and during the initial period of the arc C the polishing heads will be tightly compressed against the bearing parts 60. Arc C of the cam is shaped so that the pressure will gradually diminish from the initial point D to the end point E so that there will be a gradual fade-out, and when E has been reached there is substantially little or no pressure of the emery paper against the bearings. For one revolution of the cams 28 and 30 a crankshaft 60 is polished.

To remove the crankshaft and insert a second shaft, the air valve (not shown) is operated to cause the piston 196 to retract the piston 190 away from the end 206 of the crankshaft 60. This will relieve the pressure against the end of the crankshaft 60. The operator will now turn the handle 234 to cause the interengaging surfaces of the teeth 226 and 228 to withdraw the bushing 222—and therewith the head 242—from the end of the crankshaft, or to pull the heads 248 out of the openings in the end flange of the shaft. This will enable the operator to withdraw the shaft from the oscillatable table and insert a new shaft.

We claim:

1. In a machine for polishing the bearings of a crankshaft, a carriage mounted on the machine and having a crankshaft rotatably mounted thereon, a table mounted on the machine, two master cranks mounted on the table, means to rotate the master cranks in unison, polishing arms mounted on the master cranks and adapted to polish the crankshaft bearings when in contact therewith, two rotary cams for moving the table toward the crankshaft, the shape of said cams causing the polishing arms to be tightly pressed against the bearings for an arc of about 90°, the shape of said cams then allowing the table to be withdrawn sufficiently to leave a small space between the ends of the polishing arms and the bearings to enable the polishing surfaces and the bearings to be flushed with oil, the cams then again pressing the polishing arms tightly against the crankshaft bearings, and then allowing the pressure on the arms against the bearings gradually to be lessened until the polishing arms are removed from the bearings.

2. In a machine for polishing the bearings of a crankshaft, a carriage mounted on the machine and having a crankshaft rotatably mounted thereon, a table mounted on the machine, two master cranks mounted on the table, means to rotate the master cranks in unison, polishing arms mounted on the master cranks and adapted to polish the crankshaft bearings when in contact therewith, two rotary cams for moving the table toward the crankshaft, the shape of said cams causing the polishing arms to be tightly pressed against the bearings for an arc of about 90°, the shape of said cams then allowing the carriage to be withdrawn sufficiently to leave a small space between the ends of the polishing arms and the bearings to enable the polishing surfaces and the bearings to be flushed with oil, the cams then again pressing the polishing arms tightly against the crankshaft bearings, and then allowing the pressure on the arms against the bearings gradually to be lessened until the polishing arms are removed from the bearings, and means to reciprocate the carriage during the polishing operation.

3. In a crankshaft lapping machine, means rotatably and reciprocably to mount the crankshaft to be polished, a table movable to and from the crankshaft, two master crankshafts rotatably mounted on the table, means on the master crankshafts to cause the bearings on the first named crankshaft to be polished when the machine is operated, cam means to move the table to and from the crankshaft, said cam means causing the polishing means to be tightly pressed against the bearings of the crankshaft for part of the movement of the cam means, the shape of the cam then allowing the table to be withdrawn from the bearings sufficiently to leave a small space between the ends of the polishing means and the crankshaft bearings, the cam means then again causing the polishing means to be tightly pressed against the bearings for a definite arc of movement of the cam means and then gradually diminishing the pressure until the polishing arms are released from the bearings, a power shaft mounted on the machine, means to drive one of the crankshafts from the power shaft, means interconnecting the two master cranks and causing the second crankshaft to be driven from the first, and means connected to the power shaft to rotate and reciprocate said first-mentioned means.

FRANK W. HAEGER.
EMIL P. ROHRBACH.